United States Patent [19]
Powell et al.

[11] Patent Number: 5,678,237
[45] Date of Patent: Oct. 14, 1997

[54] IN-SITU VITRIFICATION OF WASTE MATERIALS

[75] Inventors: James R. Powell, Shoreham; Morris Reich, Kew Gardens Hills; Robert Barletta, Wading River, all of N.Y.

[73] Assignee: Associated Universities, Inc., Washington, D.C.

[21] Appl. No.: 668,906

[22] Filed: Jun. 24, 1996

[51] Int. Cl.[6] .................................................. G21F 9/00
[52] U.S. Cl. ....................... 588/11; 588/252; 588/16; 422/159; 422/186.04; 219/660; 976/DIG. 385
[58] Field of Search .................. 588/11, 16, 252, 588/253; 422/159, 186.04; 250/507.1; 976/DIG. 385; 219/600, 660

[56] References Cited

U.S. PATENT DOCUMENTS

| | | | |
|---|---|---|---|
| 2,977,194 | 3/1961 | Loeding et al. | |
| 4,376,598 | 3/1983 | Brouns et al. | 405/258 |
| 4,404,129 | 9/1983 | Penberthy et al. | 252/629 |
| 4,490,287 | 12/1984 | Hardwick et al. | 252/629 |
| 4,615,833 | 10/1986 | Kaufmann | 252/629 |
| 4,816,228 | 3/1989 | Yoshida et al. | 422/159 |
| 4,818,878 | 4/1989 | Popp et al. | 250/507.1 |
| 4,847,009 | 7/1989 | Madle et al. | 252/633 |
| 4,902,446 | 2/1990 | Erbse et al. | 252/633 |
| 4,987,313 | 1/1991 | Baatz et al. | 250/506.1 |
| 5,185,104 | 2/1993 | Horie | 252/633 |
| 5,248,453 | 9/1993 | Ramm | 252/629 |
| 5,298,196 | 3/1994 | Heung | 252/633 |
| 5,322,603 | 6/1994 | Kameda et al. | 204/158.2 |
| 5,424,042 | 6/1995 | Mason et al. | 422/159 |

OTHER PUBLICATIONS

"Tank Waste Remediation System Functions and Requirements", DOE/RL-92-60-Rev. 1 (Aug. 1994).
Garrison H., et al., "Fiscal Year 1995 Hanford Mission Plan, vol. 1, Site Guidance", DOE/RL-93-102 (Jul. 1994).
"Tank Waste Remediation System Decisions and Risk Assessment", WHC-EP-0786 (Sep. 1994).
Boomer K., "Tank Waste Technical Options Report", WHC-EP-0616 (1993).
Orme R., et al., "TWRS Process Flowsheet", WHS-SD-W-M-TI-613 (1994).
Bryan G., et al., "High-Level Waste Virification Product Characterization", in *Scientific Basis for Nuclear Waste Management*, vol. 2, C. Northrup, ed., Plenum, pp. 147–154 (1980).

*Primary Examiner*—Ngoclan Mai
*Attorney, Agent, or Firm*—Margaret C. Bogosian

[57] ABSTRACT

A method for the in-situ vitrification of waste materials in a disposable can that includes an inner container and an outer container is disclosed. The method includes the steps of adding frit and waste materials to the inner container, removing any excess water, heating the inner container such that the frit and waste materials melt and vitrify after cooling, while maintaining the outer container at a significantly lower temperature than the inner container. The disposable can is then cooled to ambient temperatures and stored. A device for the in-situ vitrification of waste material in a disposable can is also disclosed.

80 Claims, 4 Drawing Sheets

| Description | Description | Approximate time required |
|---|---|---|
| 1A. Position empty inner container inside heating coil | The disposal can is introduced through the entrance transfer lock, raised by the hydraulic lift inside the heating coil, and held in place by engaging the central support rod and emplacing movable side supports. | 2 Hours |
| 1B. Introduce HLW slurry into inner container and pump out water | A slurry of HLW solids Frit materials, and water is pumped into the inner container through the external vent/fill tube. A separate small tube (not shown) inside the central porous vent tube sucks up water that drips out of the packed annular bed. The HLW solids remaining will then be like a bed of wet sand. | 2 Hours |
| 2. Inductively heat the graphite/alumina inner container to dry out the HLW solids | The inductive heating coil heats the graphite/alumina inner container. Heat is thermally conducted into the wet HLW solids bed, vaporizing and driving off the water. The steam exits through the central porous ceramic vent tube to the top of the inner container where it is collected by a transfer line that connects to an external condenser. The coupling between the container and transfer line is remotely engaged. | 12 Hours |
| 3. Seal external vent/fill tube | Disconnect transfer line to vent/fill tube, insert plug, and seal weld shut. | 2 Hours |
| 4A. Inductively melt HLW waste | Increase temperature of graphite/alumina inner container-continue heating until HLW waste is vitrified. | 30 Hours |
| 4B. Cool Inner Container | The melted HLW waste solidifies and the disposal can cools off. | 30 Hours |
| 5. Enclose Inner Container in Outer Steel Container | The outer shell is lifted to enclose the cooled disposal can. The combination is then lowered and removed through the exit transfer lock. | 2 Hours |
| 6. Seal Steel Outer Container | A cap is put in the outer shell and seal welded shut. | 2 Hours |
| | | 82 Hours |

FIGURE 4

IN-SITU VITRIFICATION OF WASTE MATERIALS

This invention was made with Government support under contract number DE-AC02-76CH00016, between the U.S. Department of Energy and Associated Universities, Inc. The Government has certain rights in the invention.

FIELD OF THE INVENTION

The invention described in this specification relates to an improved method for vitrifying and storing waste materials, such as nuclear waste, and improved devices for conducting such methods.

BACKGROUND OF THE INVENTION

Finding a solution to the problem of the safe, long-term storage of solid wastes is difficult and important. The factors to be considered in a storage system are safety, cost, reliability, and maintainability.

An example of a proposed program for the permanent storage of nuclear wastes presently contained at Hanford, Wash., is called the Tank Waste Remediation System (TWRS). The functions and requirements for the TWRS program, together with descriptions of the technology are set forth in a number of TWRS documents. These documents include "Tank Waste Remediation System Functions and Requirements," DOE/RL-92-60-Rev1 (August, 1994); Garson, H., "Fiscal Year 1995 Hanford Mission Plan, Vol. 1, Site Guidance," DOE/RL-93-102 (July, 1994); "Tank Waste Remediation System Decisions and Risk Assessment," WHC-EP-0786 (September, 1994); Boomer, K., "Tank Waste Technical Options Report," WHC-EP0616 (1993); Orme, R., et al., "TWRS Process Flow Sheet," WHC-SD-WM-TI-613 (1994).

The TWRS program is designed to retrieve the liquid and solid radioactive wastes presently stored in 177 tanks at Hanford, and to process them to concentrate their radionuclides into a small volume High-Level Waste (HLW), and a larger volume Low-Level Waste (LLW). The HLW and LLW are then vitrified. The vitrified HLW would be sent to an off-site geologic repository, while the vitrified LLW would remain at Hanford.

According to the TWRS flow sheet, the wastes are retrieved from the temporary storage tanks. The solids portion is washed with water to remove soluble salts, and then washed with 3M NaOH to dissolve out additional material. The remaining solids then go the HLW vitrification facility. The combined liquid streams go to the LLW pretreatment facility, where the dissolved cesium is extracted by an ion-exchange resin resulting in a decontamination factor of approximately 100. The recovered cesium is combined with the HLW solids, while the treated liquid goes to the LLW vitrification facility. Vitrification takes place in a large high temperature melter.

The TWRS effort, however, is expected to be expensive. The program is estimated to have a total cost of approximately 40 billion dollars.

Moreover, there appear to be substantial unknowns and risks with regard to the technologies proposed for retrieving, processing, and vitrifying the waste. In general, the planned facilities will be large, complex, expensive, and experimental. The feasibility, reliability, and maintainability of the TWRS effort are questionable. The need for a long-life high temperature melter is especially troublesome.

Methods have also been described for the in-situ vitrification of nuclear wastes. For example, Bryan, et al. of the Pacific Northwest Laboratory describe a spray calciner/in-can melter system for the vitrification of high-level liquid waste from spent fuel discharged from an operating Light Water Reactor (LWR). [Brian, G., et al., "High-Level Waste Vitrification Product Characterization,"*Scientific Basis for Nuclear Waste Management*, vol. 2. C. Northrop, ed., pp. 147–154, (1982)]. In the method described by Bryan, et al., the waste glass canisters used in the in-can melting process were maintained at 1000–1050° C. during the filling of the can. The filled cans were cooled while still in the furnace, until the wall temperature was 550° C., at which temperature the canisters were maintained for six hours. The canisters were then allowed to cool to 200° C. The process resulted in the vitrification of the nuclear waste as a borosilicate glass.

Similarly, Hardwick, et al. of the United Kingdom Atomic Energy Authority described in U.S. Pat. No. 4,490,287 a method for incorporating radioactive wastes in a solid glass-like or ceramic material. The waste material and glass-forming or ceramic-forming frit are said to be introduced into a vessel and subjected to microwave radiation for drying and vitrification.

The in situ vitrification methods described above suffer from the disadvantage that the outer wall of the vessel becomes extremely hot during the vitrification process. This problem limits the degree to which the vessel can be heated, and may result in damage to the vessel, resulting in leakage.

An object of the present invention is to reduce the cost and to improve the safety, reliability, and maintainability of methods for the processing and storage of solid wastes, such as nuclear solid wastes. Another object of the present invention is to provide a method for the in-situ vitrification of solid waste in which the inner container of a closed, relatively small disposable can may be heated to high temperature, while the outer container of the disposable can is maintained at a significantly lower temperature. Yet another object of the present invention is the permanent storage of vitrified solid waste in the disposable can in which the solid waste was vitrified. Still another object of the present invention is a vitrification method and device wherein the vitrified waste inside the disposable can be reheated to high temperature without degrading the disposable can so that the contents of the inner container can be annealed, if necessary.

SUMMARY OF THE INVENTION

These, and other objects as will be apparent to those having ordinary skill in the art, have been achieved by providing a method for the in-situ vitrification of waste materials in a disposable can that includes an inner container and an outer container, the method having the following steps:

(a) adding frit materials and the waste materials to the inner container;

(b) removing any excess water;

(c) heating the inner container in such a way that the inner container attains a temperature at which the frit materials and the waste materials melt and vitrify after cooling, while maintaining the outer container at a significantly lower temperature than the inner container;

(d) cooling the disposable can to ambient temperatures; and (e) storing the disposable can.

The present invention further provides a device for the in-situ vitrification of waste material in a disposable can. The device includes:

(a) a disposable can which has an inner container and an outer container;

(b) a means for adding frit materials and the waste materials to the inner container;

(c) the means for removing water;

(d) a means for heating the inner container in such a way that the inner container obtains temperature at which the frit materials and the waste materials melt and vitrify while the outer container maintains a significantly lower temperature than the inner container; and (e) a means for cooling the disposable can to ambient temperatures.

The present invention also provides for a device for the in-situ vitrification of solid waste, which includes a disposable can. The disposable can incudes an electrically conducting inner container and an outer container, a fill tube extending from the inner container through the outer container to the atmosphere for adding waste materials from outside the disposable can to the inner container, an external vent tube extending from the inner container through the outer container to the atmosphere for venting gases from the inner container to the atmosphere, and a power transformer which has a multi-turn inductive coil as the primary, the inner container acting as the secondary of the power transformer when the inductive heating coil is energized with an electric current. In one such device, the inner container is heated by means of an external low frequency inductive heating coil.

DESCRIPTION OF THE DRAWINGS

FIG. 1 illustrates the embodiment of the invention described in Example 1.

FIG. 2 illustrates the embodiment wherein an outer shell covers the disposal can for extra protection.

FIG. 4 shows the time line for an embodiment of the invention illustrated in FIG. 1.

DETAILED DESCRIPTION OF THE INVENTION

In the method of the invention, solid waste materials are subjected to in-situ vitrification in a disposable can. Any solid waste material that requires high temperature to be put into condition for final, long term storage may be processed in accordance with the invention.

Typically, the solid waste material will be nuclear waste. As used in the present invention, nuclear waste refers to low level radioactive waste and high level radioactive waste. Low level radioactive wastes or "LLW" as defined by Nuclear Regulatory Commission Regulations (NRC) set forth in 10 C.F.R. 61 do not include spent nuclear fuel, transuranic waste or by-product materials which are defined as high level radioactive wastes or HLW in § 11 e(2) of the Atomic Energy Act of 1954 at 43 U.S.C. 2014 (e).

Low-level radioactive wastes include, for example, radioactive material found in evaporator concentrate, ion exchange resins, incinerator bottom ash, filtration sludges, and contaminated filters and membranes. Cs-137, Co-57 and Sb-125 are examples of radioactive constituents.

High level radioactive wastes include, for example, leftover radioactive materials after fuel rods have been dissolved and subjected to chemical processing such as the PUREX process.

Prior to being processed in accordance with the invention, the nuclear waste may be pre-processed by known techniques. One purpose of the pre-treatment is the reduction of solids in the HLW stream.

For example, the nuclear waste may be subjected to simple sludge washing or enhanced sludge washing. Simple sludge washing involves washing with water. Enhanced sludge washing involves washing with alkali solutions, such as 3M NaOH. The resulting liquid streams become the LLW. The remaining suspension of solids become the HLW. Soluble cesium may be extracted from the LLW liquid streams by ion exchange, and returned to the HLW.

The nuclear waste may also be pre-processed by means of the TRUEX process and/or the "clean option." The TRUEX process involves washing with nitric acid. The "clean option" involves subjecting nuclear wastes processed by TRUEX to additional, more elaborate solvent extractions as described in Boomer, K., "Tank Waste Technical Options Report," WHC-EP-0616 (1993).

The disposable can comprises an inner container and an outer container. The inner container is preferably constructed from an electrically conducting material. Some suitable electrically conducting materials include, for example, graphite, iron, steel, platinum and Inconel™. The preferred electrically conducting material is graphite.

The inner container may also be constructed from materials that consist essentially of non-conducting materials. Some suitable non-conducting materials include, for example, alumina, magnesia and zirconia and mixtures thereof. An inner container made of an electrically non-conducting material preferably comprises electrically conducting elements, such as conducting rods, coils, and tubes.

The inner container preferably comprises a liner of a refractory material. Some suitable refractory materials for the liner include, for example, alumina, magnesia and zirconia.

The outer container may be made of any suitable material that can be stored on a substantially permanent basis. For the purpose of this specification, substantially permanent shall mean for at least about 500 years, preferably for at least about 2000 years. The material may be a metal or a mixture of metals. Stainless steel is preferred. Non-conducting materials are desirable, however, they are brittle and subject to failure. An example of a non-conductive material useful for the invention is graphite. Plastics could also be used for toxic wastes but not for radioactive material containing wastes.

The outer container and the inner container are preferably separated by a thermally insulating material. Some suitable thermally insulating materials include, for example, ceramic materials. A preferred thermally insulating ceramic material is alumina, preferably in the form of alumina firebrick, such as low density alumina firebrick. There are many useful compositions of firebrick with various concentrations of alumina, magnesia and silica. The amount of thermally insulating material used is an amount that maintains the outer container at a significantly lower temperature than the inner container.

The inner container is fitted with a fill tube that extends through the outer container to the atmosphere. The tube is capable of being opened and closed by means, for example, of a plug and/or a lid. The fill/vent tube shown in FIG. 1B could also accommodate a cold trap for reducing volatilized contamination during the vitrification step.

Waste material and frit material are added to the inner container by methods well known in the art. For example, the waste material and the frit material can be added separately or together as a mixture. The waste material and the frit material can be added in the form of solid particles, an aqueous solution, or as a suspension or slurry in water. The waste material is added to the inner container through the fill tube.

The frit materials suitable for use in the present invention are capable of forming a glass or glass-like substance when heated together with the waste materials under the conditions described below. The method of the present invention is capable of producing a wide range of glass or glass-like compositions. Some examples of glass or glass-like substances that can be made in accordance with the invention include borosilicate glasses.

The glass or glass-like compositions made in accordance with the invention depend on various operating parameters, including the feed and frit compositions, the frit/feed ratio, and the vitrification temperature. Frit materials suitable for use in the present invention are well known in the art.

Some suitable examples of frit materials include, for example, silica, borax, alumina, magnesia and borosilicates. In general, the frit contains a broad mixture of glass forming compounds that is added in the proper proportion to compensate for whatever is missing from the desired final composition. For example, the final composition can be a borosilicate glass, an alumina silicate glass, a phosphate glass and the like. The frit/feed ratios suitable for use in the present invention include any ratio that produces a substantially permanent glass or glass-like composition under the operating conditions.

The frit/feed ratio depends upon the final glass composition desired and the composition of the feed. The value of the frit/feed ratio is thus a quantity arrived from the input and output conditions and is not a prescriptive parameter. Some suitable examples of frit/feed ratios include 1/1, 3/1, 6/1, depending on the input and output conditions.

An example of frit compositions is set forth in Table 1. In the first column, Table 1 lists the typical components of frit composition. In the second column there are listed concentrations of frit components found in the glass of the Savannah River Plant. The fourth column is an example of frit material of the invention before feed is added to it. Column three illustrates glass compositions obtained by using the frit material from column four and the feed composition set forth in Table 2.

TABLE 1

COMPARISON OF SAVANNAH RIVER & SMILE TRUEX GLASS WASTE

| Component | Weight % | | |
|---|---|---|---|
| | Savannah River Glass | SMILE-TRUEX Glass | Frit for SMILE Glass |
| $SiO_2$ | 41.1 | 40.0* | 45.9 |
| $Fe_2O_3$ | 14.5 | 10.1* | 10.9 |
| $Na_2O$ | 13.6 | 13.0 | 12.5 |
| $B_2O_3$ | 10.4 | 10.4 | 14.0 |
| $Li_2O$ | 4.0 | 4.0 | 5.4 |
| $MnO_2$ | 4.0 | 4.0 | 5.3 |
| Other Solids | 3.0 | 4.6* | — |
| $Al_2O$ | 2.8 | 6.9* | — |
| NiO | 1.8 | 1.8 | 1.5 |
| MgO | 1.4 | 1.4 | 1.9 |
| $U_3O_8$ | 1.4 | 1.2* | — |
| CaO | 1.1 | 1.1 | 1.5 |
| TiO | 0.7 | 0.7 | 0.9 |
| $ZrO_2$ | 0.4 | 0.4 | — |
| $La_2O_3$ | 0.4 | 0.4 | 0.2 |
| Total | 100.00 | 100.00 | 100.00 |

*Different composition from Savannah River Plant glass.

TABLE 2

Liquids in Output Streams from TRUEX D Process (WHC-EP-0616)
WHC-EP-0616 Rev. 0
Table G12-9. Solvent Extraction D Material Balance. (60 sheets)

| STREAM NAME LIQUID COMPONENTS | 601 | 602 | 603 | 604 | 605 | 606 | 607 | 608 | 609 | 610 |
|---|---|---|---|---|---|---|---|---|---|---|
| Total Flow (kg/CD) | 1.8E+03 | 3.63E+03 | 5.44E+03 | 5.83E+02 | 6.02E+03 | 3.79E+05 | | | | |
| CO2 | | | | | | | | | | |
| N2 | | | | | | | | | | |
| NO2 | | | | | | | | | | |
| C2 | | | | | | | | | | |
| Ag+ | 4.06E−05 | | 4.06E−05 | | 4.06E−05 | 1.26E−01 | | | | |
| Al+3 | | | | | | 1.48E+03 | | | | |
| As+5 | | | | | | | | | | |
| B+3 | | | | | | | | | | |
| Ba+2 | | | | | | | | | | |
| Bi+3 | | | | | | | | | | |
| Ca+2 | | | | | | | | | | |
| Cd+2 | | | | | | | | | | |
| Co+3 | | | | | | | | | | |

TABLE 2-continued

Liquids in Output Streams from TRUEX D Process (WHC-EP-0616)
WHC-EP-0616 Rev. 0
Table G12-9. Solvent Extraction D Material Balance. (60 sheets)

| STREAM NAME LIQUID COMPONENTS | 601 | 602 | 603 | 604 | 605 | 606 | 607 | 608 | 609 | 610 |
|---|---|---|---|---|---|---|---|---|---|---|
| $Cr^{+3}$ | | | | | | | | | | |
| $Cs^+$ | 1.50E−05 | | 1.50E−05 | 3.05E−01 | 4.05E−01 | 5.38E−03 | | | | |
| $Cu^{+2}$ | | | | | | | | | | |
| $Fe^{+3}$ | | | | | | | | | | |
| $H^+$ | | | | | | | | | | |
| $Hg^{+2}$ | | | | | | | | | | |
| $K^+$ | 2.60E−03 | | 2.60E−03 | | 2.60E−03 | 5.03E+02 | | | | |
| $La^{+2}$ | | | | | | | | | | |
| $Li^+$ | 3.38E−06 | | 3.38E−06 | | 3.38E−06 | 1.20E−02 | | | | |
| $Mg^{+2}$ | | | | | | | | | | |
| $Mn^{+4}$ | | | | | | | | | | |
| $Mo^{+6}$ | | | | | | | | | | |
| $Na^+$ | 3.57E+01 | | 3.57E+01 | 6.27E+01 | 9.84E+01 | 3.20E+04 | | | | |
| $Ni^{+3}$ | | | | | | | | | | |
| $Pb^{+4}$ | | | | | | | | | | |
| $Se^{+6}$ | | | | | | | | | | |
| $Si^{+4}$ | | | | | | | | | | |
| $Sr^{+2}$ | | | | | | | | | | |
| $Te^{+6}$ | | | | | | | | | | |
| $Ti^{+4}$ | | | | | | | | | | |
| $Ti^{+3}$ | | | | | | | | | | |
| $Th^{+4}$ | | | | | | | | | | |
| $UO2^{+2}$ | | | | | | | | | | |
| $W^{+6}$ | | | | | | | | | | |
| $Zn^{+2}$ | | | | | | | | | | |
| $Zr^{+4}$ | | | | | | | | | | |
| $C2O4^{-2}$ | 5.16E+00 | | 6.15E+00 | | 6.15E+00 | 9.74E+02 | | | | |
| $Cl^-$ | 4.63E−04 | | 4.63E−04 | | 4.63E−04 | 1.71E+02 | | | | |
| $CO3^{-2}$ | | | | | | 3.62E+02 | | | | |
| $F^-$ | 1.02E−02 | | 1.02E−02 | | 1.02E−02 | 4.08E+02 | | | | |
| $Fe(CN)6^{-3}$ | 3.98E−07 | | 4.98E−07 | | 4.98E−07 | 4.77E−01 | | | | |
| $I^-$ | 4.27E−07 | | 4.27E−07 | | 4.27E−07 | 8.27E−02 | | | | |
| $NO2^-$ | | | | | | 3.69E+03 | | | | |
| $NO3^-$ | 7.88E+01 | | 7.88E+01 | 1.32E+02 | 2.11E+02 | 5.50E+04 | | | | |
| $CH^-$ | 8.08E−01 | | 8.08E−01 | 9.05E+00 | 9.86E+00 | 7.47E+03 | | | | |
| $FO4^{-3}$ | 4.91E−01 | | 4.91E−01 | | 4.91E−01 | 2.99E+03 | | | | |
| Phosphotungstic | | | | | | | | | | |
| $SO4^{-2}$ | 5.18E−03 | | 5.18E−03 | | 5.18E−03 | 7.13+02 | | | | |
| $TcO4^-$ | 2.86E−04 | | 2.84E−04 | 1.30E+00 | 1.30E+00 | 1.04E−02 | | | | |
| $H2O$ | 1.69E+03 | 3.63E+03 | 5.32E+03 | 3.77E+02 | 5.69E+03 | 2.73E+05 | | | | |
| $MnO2$ | | | | | | 7.50E+00 | | | | |
| Organic Carbon | 3.99E−03 | | 3.99E−03 | | 3.99E+03 | 2.84E+02 | | | | |
| 2HO2:2H2O | | | | | | 8.17E+00 | | | | |
| FESA | | | | | | 2.65E+02 | | | | |
| Crown Ether | | | | | | | | | | |
| CMFO − NHH | | | | | | | | | | |
| Polyelectrolyte | 7.85E−07 | | 7.85E−07 | | 7.85E−07 | 1.63E−05 | | | | |
| Ca—Ba 137 (Ci) | 1.30E+00 | | 1.30E+00 | 3.51E+04 | 3.51E+04 | 4.66E+02 | | | | |
| Sr—Y 90 (Ci) | | | | | | | | | | |
| Tc 99 (Ci) | 2.96E−03 | | 2.96E−03 | 1.35E+01 | 1.35E+01 | 1.08E−01 | | | | |
| Pu (Ci) | | | | | | | | | | |
| Am (Ci) | | | | | | 2.76E+00 | | | | |
| | | | Output Streams | | HLW | LLW | | | | |

TABLE 2

Solids in Output Streams from TRUEX D Process (WHC-EP-01616 Rev. 0)
WHC-EP-0616 Rev. 0
Table G12-9. Solvent Extraction D Material Balance. (60 sheets)

| STREAM NAME LIQUID COMPONENTS | 601 | 602 | 603 | 604 | 605 | 606 | 607 | 608 | 609 | 610 |
|---|---|---|---|---|---|---|---|---|---|---|
| Total Flow (Kg/CD) | 1.81E+03 | | 1.81E+03 | | 1.81E+03 | 1.74E+03 | | | | |
| $Ag^+$ | 2.87E−02 | | 2.87E−02 | | 2.87E−02 | 1.43E−05 | | | | |
| $Al^{+3}$ | 7.10E+01 | | 7.01E+01 | | 7.01E+01 | 3.55E−02 | | | | |
| $As^{+5}$ | 4.64E−02 | | 4.64E−02 | | 4.64E−02 | 2.48E−01 | | | | |
| $B^{+3}$ | 1.01E−01 | | 1.01E−01 | | 1.01E−01 | 7.96E−01 | | | | |
| $Ba^{+2}$ | 3.95E−02 | | 3.95E−02 | | 3.95E−02 | 5.78E−01 | | | | |

TABLE 2-continued

Solids in Output Streams from TRUEX D Process (WHC-EP-01616 Rev. 0)
WHC-EP-0616 Rev. 0
Table G12-9. Solvent Extraction D Material Balance. (60 sheets)

| STREAM NAME LIQUID COMPONENTS | 601 | 602 | 603 | 604 | 605 | 606 | 607 | 608 | 609 | 610 |
|---|---|---|---|---|---|---|---|---|---|---|
| $Bi+3$ | 2.18E+01 | | 2.18E+01 | | 2.18E+01 | 6.97E+01 | | | | |
| $Ca+2$ | 5.47E+00 | | 5.47E+00 | | 5.47E+00 | 5.22E+01 | | | | |
| $Cd+2$ | 5.29E−01 | | 5.29E−01 | | 5.29E−01 | 3.18E+00 | | | | |
| $Ce+2$ | 8.14E+01 | | 8.14E+01 | | 8.14E+01 | 1.60E+00 | | | | |
| $Co+3$ | 5.43E−02 | | 5.43E−02 | | 5.43E−02 | 2.31E−01 | | | | |
| $Cr+3$ | 4.45E+00 | | 4.45E+00 | | 4.45E+00 | 5.33E+01 | | | | |
| $Cs+$ | 4.58E−03 | | 4.58E−03 | | 4.58E−03 | 2.29E−06 | | | | |
| $Cu+2$ | 5.43E−02 | | 5.43E−02 | | 5.43E−02 | 2.90E−01 | | | | |
| $Fe+3$ | 2.63E+01 | | 2.63E+01 | | 2.63E+01 | 2.30E+02 | | | | |
| $H+$ | | | | | | | | | | |
| $Hg+2$ | 3.24E−04 | | 3.24E−04 | | 3.24E−04 | 4.10E−01 | | | | |
| $K+$ | 1.12E−02 | | 1.12E−02 | | 1.12E−02 | 5.61E−06 | | | | |
| $La+2$ | 1.34E+01 | | 1.34E+01 | | 1.34E+01 | 2.38E−01 | | | | |
| $Li+$ | 2.39E−03 | | 2.39E−03 | | 2.39E−03 | 1.19E−06 | | | | |
| $Mg+2$ | 1.56E−01 | | 1.56E−01 | | 1.56E−01 | 1.73E+00 | | | | |
| $Mo+6$ | 1.92E−01 | | 1.92E−01 | | 1.92E−01 | 2.76E+00 | | | | |
| $Na+$ | 1.96E+01 | | 1.96E+01 | | 1.96E+01 | 9.79E−03 | | | | |
| $Ni+3$ | 4.81E−01 | | 4.81E−01 | | 4.81E−01 | 3.22E+00 | | | | |
| $Pb+4$ | 7.11E−02 | | 7.11E−02 | | 7.11E−02 | 1.22E+00 | | | | |
| $Se+6$ | 1.30E−01 | | 1.30E−01 | | 1.30E−01 | 7.03E−01 | | | | |
| $Si+4$ | 2.24E+00 | | 2.24E+00 | | 2.24E+00 | 1.88E+01 | | | | |
| $Sr+2$ | 3.43E−01 | | 3.43E−01 | | 3.43E−01 | 6.97E−03 | | | | |
| $Te+6$ | 1.83E−02 | | 1.83E−02 | | 1.83E−02 | 6.96E−02 | | | | |
| $Ti+4$ | 3.68E−02 | | 3.68E−02 | | 3.68E−02 | 1.19E−01 | | | | |
| $Tl+3$ | 3.70E−01 | | 3.70E−01 | | 3.70E−01 | 1.56E+00 | | | | |
| $Th+4$ | 4.70E+00 | | 4.70E+00 | | 4.70E+00 | 1.01E−01 | | | | |
| $UO2+2$ | 7.50E+01 | | 7.50E+01 | | 7.50E+01 | 4.65E+02 | | | | |
| $W+6$ | 1.32E−05 | | 1.32E−05 | | 1.32E−05 | 1.15E+00 | | | | |
| $Zn+2$ | 6.40E−02 | | 6.40E−02 | | 6.40E−02 | 7.59E−01 | | | | |
| $Cl-$ | 7.87E−02 | | 7.87E−02 | | 7.87E−02 | 3.94E−05 | | | | |
| $CO3-2$ | 5.62E+00 | | 5.62E+00 | | 5.62E+00 | 2.81E−03 | | | | |
| $F-$ | 1.41E+00 | | 1.41E+00 | | 1.41E+00 | 7.06E−04 | | | | |
| $I-$ | 5.08E−05 | | 5.08E−05 | | 5.08E−05 | 2.54E−08 | | | | |
| $NO2-$ | 1.76E+00 | | 1.76E+00 | | 1.76E+00 | 8.79E−40 | | | | |
| $NO3-$ | 4.18E+01 | | 4.18E+01 | | 4.18E+01 | 2.09E−02 | | | | |
| $CH-$ | 1.17E+02 | | 1.17E+02 | | 1.17E+02 | 4.46E+02 | | | | |
| $PO4-3$ | 1.53E+02 | | 1.53E+02 | | 1.53E+02 | 7.67E−02 | | | | |
| $SO4-2$ | 1.22E+00 | | 1.22E+00 | | 1.22E+00 | 6.10E−04 | | | | |
| $TcO4-$ | 2.91E−02 | | 2.91E−02 | | 2.91E−02 | 1.46E−05 | | | | |
| Cancrinite | 9.47E+02 | | 9.47E+02 | | 9.47E+02 | 4.74E−01 | | | | |
| $MnO2$ | 6.81E+00 | | 6.81E+00 | | 6.81E+00 | 6.03+01 | | | | |
| $Ni2Fe(CN)6$ | 1.75E+02 | | 1.75E+02 | | 1.75E+02 | 8.74E−02 | | | | |
| $P2O5:24WO2:44B2O$ | 7.30E−01 | | 7.30E−01 | | 7.30E−01 | 6.32E+00 | | | | |
| Organic Carbon | 1.17E+00 | | 1.17E+00 | | 1.17E+00 | 5.83E−04 | | | | |
| $2RO2:2H2O$ | 2.85E+01 | | 2.85E+01 | | 2.85E+01 | 3.09E+02 | | | | |
| Polyelectrolyte | 3.09E+00 | | 3.09E+00 | | 3.09E+00 | 3.04E+00 | | | | |
| Ca—Ba 137 (Ci) | 3.97E+02 | | 3.97E+02 | | 3.97E+02 | 1.98E−01 | | | | |
| Sr—Y 90 (Ci) | 4.77E+04 | | 4.77E+04 | | 4.77E+04 | 9.68E+02 | | | | |
| Tc 99 (Ci) | 3.02E−01 | | 3.02E−01 | | 3.02E−01 | 1.51E−04 | | | | |
| Pu (Ci) | 1.96E+01 | | 1.96E+01 | | 1.96E+01 | 8.25E−01 | | | | |
| Am (Ci) | 4.84E+01 | | 4.84E+01 | | 4.84E+01 | 2.42E−01 | | | | |
| | | Output Streams | | | HLW | LLW | | | | |

All, or substantially all, of the water present in the inner container following the addition of the frit materials and the waste materials is removed by methods well known in the art. For example, at least some of the liquid water can be pumped out through an external vent tube. The external vent tube may be the same tube that is used to fill the inner container, or may be a separate tube.

The inner container may further comprise an internal vent tube for venting liquid water, water vapor, or other gases. The internal vent tube is preferably made of a heat-resistant porous material, such as a porous ceramic. Some suitable porous ceramic materials include, for example, alumina, zirconia, magnesia and mixtures thereof. The internal vent tube preferably extends from within approximately one inch of the bottom of the inner container to within approximately one (1) inch of the top of the container. Preferably, the internal vent tube touches or almost touches the bottom of the inner container.

There are several ways in which the liquid water present in the waste materials can be removed. There can be a separate connection to receive the liquid water from the internal vent tube. In another embodiment of the invention, two external lines could be inserted into a combined the fill/vent tube which is connected to the inner container. One of the lines can be used to introduce the wet slurry, while the second flexible outlet line extends to the internal vent tube to remove pumped water. In yet another embodiment of the invention, water is removed by reducing the pressure in the container and allowing it to vaporize.

Irrespective of whether or not a pumping step is employed, the waste solids, suspension, and/or solution in the inner container is sequentially heated to a sufficiently high final temperature to drive off all liquid water, any water of hydration, and any residual decomposition gases. The water vapor and any other gases exit the disposable can through the porous internal vent tube and the external vent tube.

The preferred temperature for the drying step is dependant upon various factors, such as the nature of the feed, and is approximately from about 300° C. to about 800° C. The minimum final temperature for the drying step is about 300° C., preferably about 400° C., more preferably about 600° C. The final temperature for the drying step should not exceed about 650° C., preferably about 700° C., more preferably about 800° C.

The temperature for the heating step may be attained by any method known in the art. Preferably, the drying step is achieved with inductive heating, as described below.

After the drying step is completed, the dry refractory waste and frit materials are heated to a temperature sufficient to vitrify the waste mixture. The minimum temperature range sufficient to vitrify the waste mixture is about 1100° C., preferably about 1200° C., more preferably about 1300° C. The maximum temperature for the vitrification step is about 1350° C., preferably about 1400° C., more preferably about 1500° C. The external fill and vent tube or tubes is/are preferably closed to the atmosphere during the vitrification step.

The inner container is heated during the vitrification step by any suitable method known in the art. The preferred heating method is inductive heating.

Inductive heating can be accomplished by energizing an external multi-turn coil with an electric current. The external multi-turn coil acts as the primary of a power transformer. The current may be AC or DC. AC current is preferred.

A suitable range for the current energizing coil is from about 10 Hertz to about 1000 Hertz. A more preferred range is from about 20 Hertz to about 400 Hertz, wherein the most preferred range is from about 30 Hertz to about 100 Hertz.

The inner container, which is made of a conducting material or comprises conducting elements, as discussed above, acts as the secondary of the power transformer. The induced current in the secondary heats the inner container, which, in turn, heats the waste and flit materials.

The method and device for carrying out the method of the invention are designed to minimize the escape of volatized waste materials. The escape of volatized wastes is minimized by limiting the temperature during the drying step to a temperature at which the escape of volatized waste materials is insignificant or, at least, at an acceptable level. The escape of volatized waste materials during the vitrification step can be minimized by conducting the vitrification step in a closed system.

In the case of nuclear wastes, the most common source of volatized contamination is cesium. The mount of volatized contamination escaping to the atmosphere can be reduced by inserting a cold trap inside the disposable can to retain the contamination. The cold trap can be located in the vent tube of the inner container.

A major advantage of the present invention is that the outer container is maintained at a temperature significantly lower than that of the inner container during the drying and vitrification steps. Preferably, the exterior wall of the outer container does not exceed a temperature from about 100° C., preferably about 200° C., more preferably about 300° C. As used in the present invention "significantly lower tempera-ture" means a temperature for the outer container ranging from about 800° C. to about 1400° C., preferably 1000° C. to about 1200° C. lower than that of the inner container.

Following the vitrification step, the disposable can is cooled to ambient temperatures or near ambient temperatures for substantially permanent storage. Cooling is carried out by any suitable method known in the art. Air cooling is preferred. Storage may be underground or above ground.

The outer container of the disposable can completely covers the inner container, except for the one or more tubes that lead from the inner container to the atmosphere for filling and venting the inner container. Filling and venting can be accomplished through separate tubes, although they are preferably accomplished through the same tube used for both purposes.

The outer container can be covered with an additional outer shell for additional protection. The outer shell may be made of any material that can be stored for substantially permanent storage. A preferred material for the outer shell is stainless steel or Inconel™.

EXAMPLES

Example 1

Figure 1A:
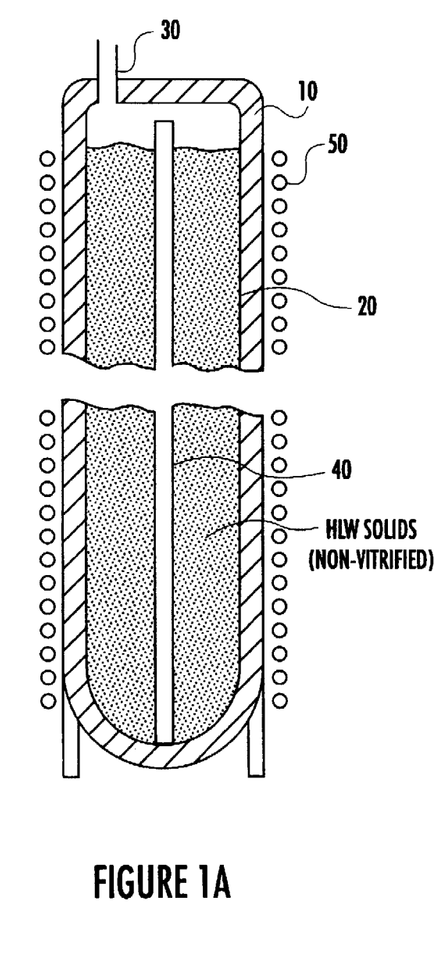
FIG. 1A shows the inner container during the fill and drying phases of operation.

This example illustrates one embodiment of the invention described above. The embodiment is called Small Module Inductively Loaded Energy (SMILE). FIG. 1A illustrates an inner container of SMILE during the fill and drying phases of the operation. Thermally insulating material and a steel outer container are indicated (see FIG. 1B).

The inner container comprises a graphite cylinder (10) with an inner alumina liner (20). The graphite is inductively heated by an outer 500-turn (1 cm, 1 meter ID) water-cooled copper inductive outer heating coil (50) that is connected to an external 300 amp, 1000 volt power source (not shown). The outer coil operates at a low frequency (e.g., approximately 30–60 Hertz), and acts as the primary of a transformer.

Figure 1B:
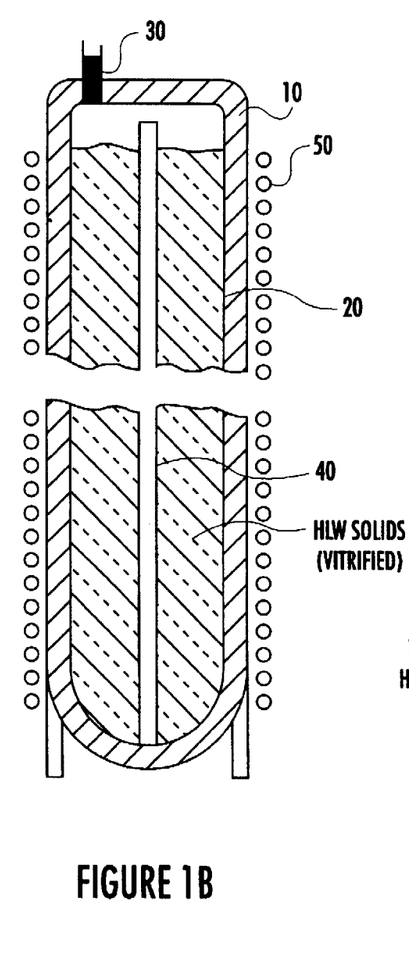
FIG. 1B shows the inner container during the vitrification phase of operation.
Figure 1C:
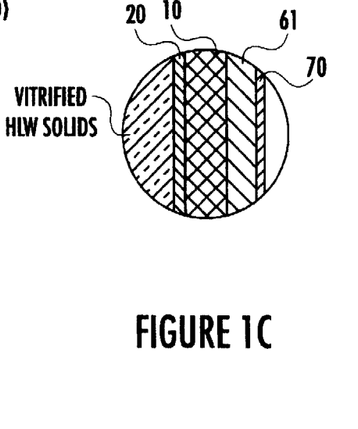
FIG. 1C shows wall detail of the disposable can.

The graphite cylinder (10) is enclosed in a stainless steel outer container (70) with a layer of thermally insulating refractory ceramic, e.g., low density alumina firebrick (60) between them as shown in FIG. 1C. The layer of alumina firebrick is at least one (1) inch and not more than three (3) inches.

The graphite inner container and the stainless steel outer container constitute parallel secondaries of the power transformer. For example, the graphite inner container can have delta r=7.5 cm, Rg=37 cm, J=18 A/cm$^2$; and the stainless steel outer container can have delta r=1 cm, Rg=46.5 cm, J=87 A/cm$^2$. The foregoing are illustrative values which depend upon the design, dimensions and current densities of the inner and outer containers. The temperatures of the containers are regulated by external air cooling and the inductive leakage rate. The graphite cylinder inner container operates at high temperature, e.g., 1200° C. or higher, while the enclosing steel outer container is maintained by auxiliary air cooling at a relatively low temperature of about 200° C.

The stainless steel outer container completely encloses the graphite cylinder and its contents except at the top of the container, where the fill/vent tube (30) is initially open.

Suitable dimensions for a disposable can are given below:

outer radius of internal porous vent tube (40)=5 cm
outer radius of HLW glass region=32.5 cm
outer radius of alumina liner=33.5 cm
outer radius of graphite cylinder=41.0 cm outer radius of thermal insulation=46.0 cm outer radius of stainless steel outer container=47.5 cm The external fill/vent tube (30) at the top of the container allows the waste/frit slurry (solids plus water) to be introduced and also allows liquid water and the gases that are released during the drying phase (e.g., stem) to exit the disposable can. An internal porous ceramic vent tube (40) collects the gases that are generated inside the annular porous bed of solids, and allows them to flow to the external vent. The steam from drying travels a maximum of about 12 inches (average about 6 inches) through the porous solid zone to reach the internal vent tube. This compares to a distance of 15 feet if there were no internal vent tube.

The inner container is filled with a wet slurry of HLW solids and frit material. Examples of frit material are set forth in Table 1 hereinabove. The method can also be adapted to storing LLW. Excess water is pumped out through the internal vent and external fill/vent tubes, leaving behind a settled bed of wet HLW solids and frit. The contents of the container are then inductively heated to a relatively low temperature (e.g., approximately 300° C.) to drive off all water in the form of steam through the porous internal vent tube (40). Inductive heating is accomplished by energizing the external inductive heating coils (50) with 30 Hertz AC current. The remaining solids contain dry refractory waste oxides and frit.

Referring now to FIG. 1B, the external vent/fill tube is closed, and the contents of the container inductively heated to a much higher temperature (i.e.,~1100° C.) to vitrify the HLW. No gases are released during the vitrification operation, since the fill/vent tube has been sealed off. This minimizes radioactive release and contamination of the vitrification facility.

After HLW solids have been vitrified and the sealed disposable can has cooled to near ambient temperature, the can is discharged to a temporary storage facility, from which it is eventually shipped to an off-site geologic repository.

Example 2

Figure 2A:
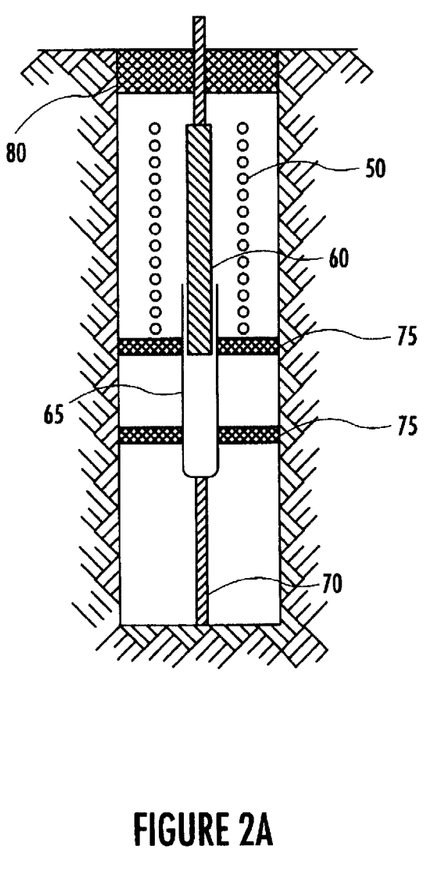
FIG. 2A shows a method for covering a disposable can with an outer shell.

For further protection, the outer container of the disposable can (60) is covered with an outer steel shell (65). The process is illustrated in FIG. 2A. The open outer steel shell is positioned below the disposal can (60) and inductive heating coil (50) during the drying and vitrification phase of the process.

Figure 2B:
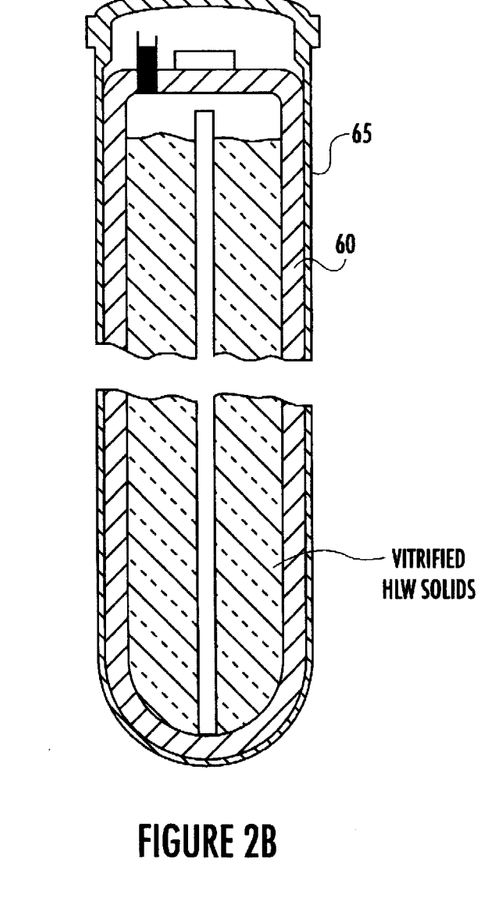
FIG. 2B shows a configuration of a disposable can covered with an outer shell.

At the beginning of the vitrification sequence, both the disposal can and the steel outer shell come in through an entrance transfer lock (not shown) at the bottom of the pit. The disposal can enters first, is raised up by the hydraulic lift (70), and then held in place by the movable side supports (75). The hydraulic lift (70) is then lowered and the outer shell (65) brought in through the transfer lock. The configuration of the outer shell covering the disposable can is illustrated in FIG. 2B.

Figure 3:
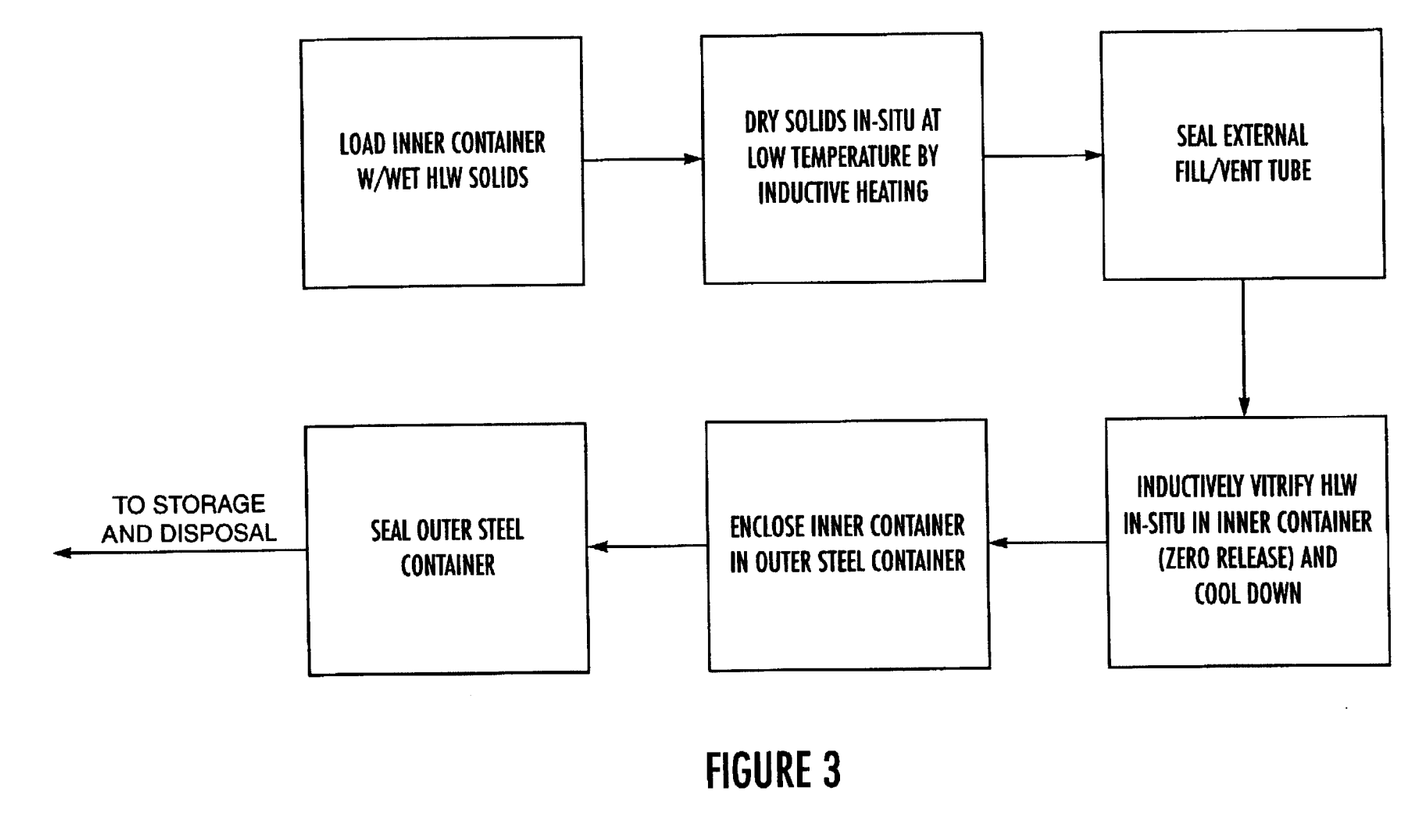
FIG. 3 shows a flow sheet for an embodiment of the invention illustrated in FIG. 1.

The treatment sequence is illustrated in FIG. 3. The inner container is filled with wet HLW solids as shown in step 1; the water is removed by moderate heating as shown in step 2; the vent/fill tube of the inner container is sealed as shown in step 3; and the HLW solids vitrified at high temperature as shown in step 4.

After the vitrification has been completed and the disposable can has cooled to near ambient temperature (see Example 1), the outer shell is raised to enclose the disposable can as shown in step 5. The outer shell (65) fits inside the heating coil (50) and is lowered with the enclosed disposable can, and removed through an exit transfer lock at the bottom of the pit (not shown).

The open top of the outer steel container is then covered with a removable lid (80), and a welded seal made remotely, completely sealing off the vitrified waste inside a double barrier container as shown in step 6 in FIG. 3. The completed disposal can/outer shell combination is shown in FIG. 2B. The finished combination is sent to an off-site geological repository.

In contrast to previously proposed HLW vitrification processes, the SMILE process will not result in any significant release of radioactive volatiles. In the drying step 2, the only volatiles are stem, which is condensed in an external cooler; in the vitrification step 4 all volatiles are fully retained inside the closed disposal can.

The projected time line for processing SMILE containers is given in FIG. 4. Steps 1A and 2A are estimated to take a total of 4 hours—this appears ample, and could probably be done somewhat faster.

We claim:

1. A method for the in-situ vitrification of waste materials in a disposable can, the disposable can comprising an inner container and an outer container, the method comprising the steps of:

(a) adding frit materials and the waste materials to the inner container;

(b) removing any excess water;

(c) heating the inner container in such a way that the inner container attains a temperature at which the frit materials and the waste materials melt and vitrify after cooling while maintaining the outer container at a significantly lower temperature;

(d) cooling the disposable can to ambient temperatures; and (e) storing the disposable can.

2. The method of claim 1 wherein the waste materials comprise nuclear waste materials.

3. A method according to claim 2 wherein the nuclear waste has been subjected to enhanced sludge washing.

4. A method according to claim 2 wherein the nuclear waste has been further subjected to acid dissolution.

5. A method according to claim 1 wherein the inner container comprises an electrically conducting material.

6. A method according to claim 1 wherein the inner container is constructed from an electrically conducting material.

7. A method according to claim 6 wherein the inner container is constructed from graphite, iron or platinum.

8. A method according to claim 1 wherein the inner container is constructed from graphite.

9. A method according to claim 1 wherein the inner container is constructed from materials that consist essentially of electrically non-conducting materials.

10. A method according to claim 9 wherein the electrically non-conducting materials comprise at least one of alumina, magnesia, zirconia or mixtures thereof.

11. A method according to claim 10 wherein the inner container constructed from materials that consist essentially of electrically non-conducting materials comprises conducting elements.

12. A method according to claim 11 wherein the electrically conducting elements comprise rods, coils and tubes.

13. A method according to claim 1 wherein the inner container comprises a liner consisting essentially of a refractory material.

14. A method according to claim 13 wherein the refractory material comprises alumina, magnesia, zirconia or combinations thereof.

15. A method according to claim 1 wherein the outer container consists essentially of stainless steel or inconel.

16. A method according to claim 1 wherein the outer container and the inner container are separated by a thermally insulating material.

17. A method according to claim 16 wherein the thermally insulating material is a ceramic material or multi-layer thermal insulation.

18. A method according to claim 17, wherein the multi-layer thermal insulation is made of layers of metallic foil separated by spun ceramic fiber.

19. A method according to claim 17 wherein the ceramic material is alumina, magnesia, zirconia or mixtures thereof.

20. A method according to claim 19 wherein the alumina comprises firebrick alumina.

21. A method according to claim 1 wherein the waste materials and frit materials are added in the form of a slurry of solids in water.

22. A method according to claim 1 wherein the frit materials comprise silica, borax, alumina, magnesia or borosilicate glass.

23. A method according to claim 1 wherein a portion of the excess water is removed from the disposable can by pumping, leaving wet solids in the inner container.

24. A method according to claim 1 wherein the excess water is removed from the disposable can by heating.

25. A method according to claim 24 wherein the heating is achieved by inductive heating.

26. A method according to claim 1 wherein a portion of the excess water is removed by pumping, and the remainder of the water is removed by heating.

27. A method according to claim 1 wherein a portion of the excess water is removed by pumping and the remainder of the water is removed by inductive heating.

28. A method according to claim 1 wherein liquid water, water of hydration, and decomposition gases are removed by means of heating to at least from about 300° C. to about 800° C.

29. A method according to claim 1 wherein liquid water, water of hydration, and decomposition gases are removed by means of heating from 400° C. to about 700° C.

30. A method according to claim 1 wherein the heating of step (c) is achieved by inductive heating.

31. A method according to claim 30 wherein the heating step is achieved by means of a power transformer comprising a multi-turn inductive heating coil as the primary of the power transformer.

32. A method according to claim 31 wherein the inductive heating coil is energized with an electric current from about 10 Hertz to about 1000 Hertz.

33. A method according to claim 31 wherein the inductive heating coil is energized with an electric current from about 20 Hertz to about 400 Hertz.

34. A method according to claim 31 wherein the inductive heating coil is energized with an electric current from about 30 Hertz to about 100 Hertz.

35. A method according to claim 31 wherein the inner container comprises the secondary of a transformer.

36. A method according to claim 1 wherein the temperature of the inner container during step (c) reaches 1100° C.–1500° C.

37. A method according to claim 36 wherein the temperature of the inner container reaches from about 1200° C. to about 1400° C.

38. A method according to claim 36 wherein the temperature of the inner container reaches from about 1300° C. to about 1350° C.

39. A method according to claim 1 wherein the temperature of the outer container does not exceed 300° C.

40. A method according to claim 1 wherein the disposable can is closed to the atmosphere during step (C).

41. A method according to claim 1 wherein the outer container is covered with an additional outer shell.

42. A method according to claim 41 wherein the additional outer shell is made from a material that consists essentially of stainless steel.

43. A device for the in-situ vitrification of waste materials in a disposable can, the device comprising:
    (a) a disposable can, the disposable can comprising an inner container and an outer container;
    (b) a means for adding frit materials and the waste materials to the inner container;
    (c) a means for removing water;
    (d) a means for heating the inner container in such a way that the inner container attains a temperature at which the frit materials and the waste materials melt and vitrify while the outer container maintains a significantly lower temperature; and
    (e) a means for cooling the disposable can to ambient temperatures.

44. A device according to claim 43 wherein the inner container comprises an electrically conducting material.

45. A device according to claim 43 wherein the inner container is constructed from an electrically conducting material.

46. A device according to claim 45 wherein the inner container is constructed from graphite, iron or platinum.

47. A device according to claim 45 wherein the inner container is constructed from graphite.

48. A device according to claim 43 wherein the inner container is constructed from materials that consist essentially of electrically non-conducting materials.

49. A device according to claim 48 wherein the electrically non-conducting materials comprise alumina, magnesia, zirconia or mixtures thereof.

50. A method according to claim 49 wherein the inner container constructed from materials that consist essentially of electrically non-conducting materials comprises conducting elements.

51. A device according to claim 50 wherein the electrically conducting elements comprise rods, coils and tubes.

52. A device according to claim 43 wherein the inner container comprises a refractory liner.

53. A device according to claim 52 wherein the refractory liner is a liner of alumina, magnesia, zirconia or mixtures thereof.

54. A device according to claim 43 wherein the outer container comprises stainless steel or inconel.

55. A device according to claim 43 wherein the outer container and the inner container are separated by a thermally insulating material.

56. A device according to claim 55 wherein the thermally insulating material comprises a ceramic material.

57. A device according to claim 56 wherein the ceramic material comprises alumina.

58. A device according to claim 57 wherein the alumina comprises alumina firebrick.

59. A device according to claim 43 further comprising a means for over packing the outer container with an outer shell.

60. A device according to claim 59 wherein the outer shell comprises stainless steel.

61. A device for the in-situ vitrification of solid waste, comprising:

a disposable can, the disposable can comprising an electrically conducting inner container and an outer container;

a fill tube extending from the inner container through the outer container to the atmosphere for adding waste materials from outside the disposable can to the inner container;

an external vent tube extending from the inner container through the outer container to the atmosphere for venting gases from the inner container to the atmosphere;

a power transformer comprising a multi-turn inductive coil as the primary, the inner container acting as the secondary of the power transformer when the inductive heating coil is energized with an electric current.

62. A device according to claim 61 further comprising an internal vent tube for transporting gases from the inner container to the external vent tube.

63. A device according to claim 62 wherein the external vent tube is porous.

64. A device according to claim 61 wherein the inner container comprises an electrically conducting material.

65. A device according to claim 61 wherein the inner container is constructed from an electrically conducting material.

66. A device according to claim 65 wherein the inner container is constructed from graphite, iron or platinum.

67. A device according to claim 65 wherein the inner container is constructed from graphite.

68. A device according to claim 61 wherein the inner container is constructed from materials that consist essentially of electrically non-conducting materials.

69. A device according to claim 68 wherein the electrically non-conducting materials comprise alumina, magnesia, silica or mixtures thereof.

70. A method according to claim 69 wherein the inner container constructed from materials that consist essentially of electrically non-conducting materials comprises conducting elements.

71. A device according to claim 70 wherein the electrically conducting elements comprise rods, coils and tubes.

72. A device according to claim 61 wherein the inner container comprises a refractory liner.

73. A device according to claim 72 wherein the refractory liner is a liner of alumina, magnesia, zirconia or mixtures thereof.

74. A device according to claim 61 wherein the outer container comprises stainless steel or inconel.

75. A device according to claim 61 wherein the outer container and the inner container are separated by a thermally insulating material.

76. A device according to claim 75 wherein the thermally insulating material comprises a ceramic material.

77. A device according to claim 76 wherein the ceramic material comprises alumina.

78. A device according to claim 77 wherein the alumina comprises alumina firebrick.

79. A device according to claim 61 further comprising a means for covering the outer container with an outer shell.

80. A device according to claim 79 wherein the outer shell comprises stainless steel.

* * * * *